June 29, 1965  J. V. COWAN  3,192,420

ELECTRO-MECHANICAL TRANSDUCERS AND THE FABRICATION THEREOF

Filed Jan. 26, 1961

INVENTOR
JOHN V. COWAN
BY
ROBERT HOCKFIELD
ATTORNEY.

United States Patent Office 3,192,420
Patented June 29, 1965

3,192,420
ELECTRO-MECHANICAL TRANSDUCERS AND
THE FABRICATION THEREOF
John V. Cowan, Danbury, Conn., assignor, by mesne
assignments, to Automation Industries, Inc., El Segundo,
Calif., a corporation of California
Filed Jan. 26, 1961, Ser. No. 85,103
6 Claims. (Cl. 310—9.5)

This invention relates to electro-mechanical transducers and the fabrication thereof, and, more particularly, pertains to new and improved transducers especially useful in ultrasonic inspection apparatus.

In ultrasonic inspection, such as disclosed in U.S. Patent No. 2,398,701, it is sometimes desirable to introduce wave energy into a test object at a selected angle relative to a normal to the entering surface of the object. This may be accomplished by tilting the transducer with respect to the entering surface and providing a wave energy coupling path between the transducer and the entering surface by means of a liquid, as disclosed in U.S. Patent No. 2,592,134 or by means of a solid material, as disclosed in U.S. Patent No. 2,527,986.

It is an object of the present invention to provide new and improved electro-mechanical transducers which may be employed to introduce wave energy into a test object at an angle to normal without the need for an intervening coupling member.

A further object of the present invention is to provide new and improved electro-mechanical transducers which upon energization emit wave energy at an angle to a normal to a wave-emitting surface.

Yet another object of the present invention is to provide a new and improved electro-mechanical transducer which upon energization emits wave energy in a plurality of directions.

Still another object of the present invention is to provide a new and improved electro-mechanical transducer which upon energization emits a highly focused beam of wave energy.

A further object of the present invention is to provide novel methods of fabricating electro-mechanical transducers.

Another feature of the present invention is the provision of new and improved apparatus for fabricating a novel transducer embodying the invention.

Briefly stated, an electro-mechanical transducer embodying the present invention comprises a piezo-electric element having a pair of substantially parallel surfaces and polarized at least in part along an axis disposed at an angle other than ninety degrees relative to said surfaces.

A transducer of the foregoing type can be fabricated in accordance with the invention by polarizing a polarizable piezoelectric element in a given direction and extracting a section of the element having at least one surface portion disposed at an angle other than ninety degrees relative to the given direction.

Apparatus for fabricating an electro-mechanical transducer, according to another feature of the invention, comprises a pair of electrical contacts for engaging opposite surfaces of a piezo-electric element, and means for displacing the contacts concomitantly relative to the piezoelectric element while maintaining the contacts in predetermined orientation with respect to one another.

The novel features of the present invention are set forth in more particularity in the appended claims. The present invention, both as to its organization and manner of operation, together with further objects and advantages thereof, may best be understood by reference to the following description taken in connection with the accompanying drawing in which:

Figure 1:
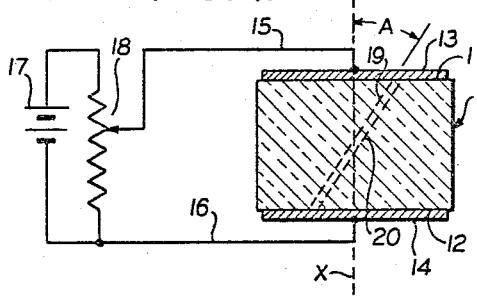
FIG. 1 is a schematic diagram of apparatus which may be employed in fabricating an electro-mechanical transducer, the fabrication and the transducer featuring individual aspects of the present invention.

In FIG. 1, a large block 10 of a polarizable piezo-electric material, such as lead zirconate, is shown to have parallel surfaces 11 and 12 which are perpendicular to an axis X and to which electrodes 13 and 14 are applied. Each of the electrodes may, for example, be composed of silver deposited in a thin layer on the corresponding surfaces 11 and 12. Electrical connections 15 and 16 extend from electrodes 13 and 14 to a source of polarizing potential comprised of a battery 17 connected to a potentiometer 18.

Element 10 is polarized by the application of a suitable potential from source 17, 18; preferably the element is maintained at an elevated temperature by means not shown. After polarization, the connections 15 and 16 are broken thereby removing the polarizing potential. Of course the temperature of the element 10 is appropriately reduced and it remains polarized along axis X. The process for polarization is well known and forms no part of the invention, thus a detailed description is unnecessary.

After polarization, a section is cut from element 10, as outlined by broken lines 19 and 20 which define parallel surfaces of a transducer slab thereby extracted. Surfaces 19, 20 are oriented at an angle A relative to axis X of some value other than ninety degrees.

Figure 2:
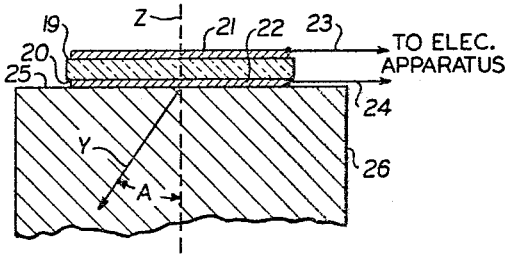
FIG. 2 represents a manner of utilizing a new and improved electro-mechanical transducer of the type fabricated by the technique illustrated in FIG. 1.

As shown in FIG. 2, the slab defined by surfaces 19 and 20 is provided with electrodes 21 and 22, such as thin layers of silver, to which electrical leads 23 and 24 are connected. These leads extend to electrical apparatus, for example, of the type disclosed in U.S. Patent No. 2,398,701 thereby incorporating the transducer 19–22 in ultrasonic inspection apparatus. The transducer is placed in contact with a surface 25 of a test object 26 and ultrasonic inspection of the test object is performed. Of course, a suitable couplant liquid is employed in the usual way to provide a good acoustic path for ultrasonic wave energy. Also, if desired, the transducer may be damped in the usual manner. In response to ultrasonic signal energy, the transducer 19–22 produces ultrasonic wave energy that passes into entering surface 25 along an axis Y at an angle A with respect to a normal Z to the surface 25. It may be seen from the foregoing description that an electro-mechanical transducer according to the present invention is adapted to emit wave energy at an angle to a normal to a wave-emitting surface thereof and an intervening coupling member is not needed.

In summary, an electro-mechanical transducer in accordance with the present invention is comprised of a piezo-electric element defined by parallel surfaces 19, 20 and polarized at least in part along an axis Y disposed at an angle other than ninety degrees relative to surfaces 19 and 20. The transducer further includes means comprised of electrodes 21 and 22 and leads 23 and 24 for establishing electrical circuit connections to surfaces 19 and 20.

Figure 3:
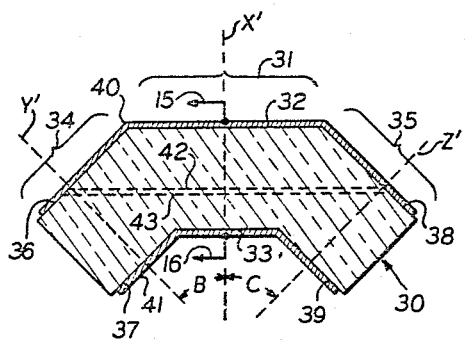
FIGS. 3 and 4 illustrate modifications which may be employed in the technique of FIG. 1 to fabricate transducers in accordance with other embodiments of the invention.

In FIG. 3, a multisection element 30 of, for example, lead zirconate, is utilized in order to provide different polarization directions. The element 30 has three sections including, for example, a central section 31, having opposed surfaces 32 and 33 perpendicular to an axis X′ integral with end sections 34 and 35. Section 34 has opposed surfaces 36 and 37 perpendicular to an axis Y′ and section 35 has opposed surfaces 38 and 39 perpendicular to another axis Z′. Axis Y′ forms an angle B relative to axis X′ while axis Z′ forms an angle C relative to axis X′. Angle C may, for example, be equal to angle B, but of opposite sign. An electrode 40 extends along surfaces 36, 32 and 38 and an electrode 41 extends along surface 37, 33 and 39. Electrical leads 15 and 16 connect the electrodes 40 and 41 to potential source 17, 18 (FIG. 1) so that the piezo-electric element 30 can be polarized. It is evident that polarization is effected along each of the axes X′, Y′ and Z′ in sections 31, 34 and 35, respectively.

After polarization a continuous slab, defined by parallel broken lines 42 and 43, is cut from element 30 and is utilized in the same manner as described in connection with FIG. 2. It is evident that the transducer thus formed provides one beam normal to the entering surface of the test object and two additional beams inclined at angles B and C to normal.

Figure 4:
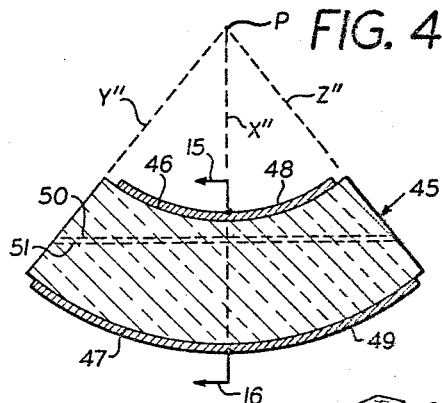

A focused transducer can be produced by utilizing a block 45 of polarizable piezo-electric material such as shown in FIG. 4. Block 45 is of generally frusto-conical configuration and includes parallel surfaces 46 and 47 which are concentric relative to the center P of the cone. Electrodes 48 and 49 are disposed on surfaces 46 and 47 and are connected by leads 15 and 16 to potential source 17, 18 for polarizing the element 45. It is evident that polarization is effected along a central axis X″ and along radii extending from point P within the axes Y″ and Z″.

After polarization a slab defined by parallel lines 50 and 51 which are perpendicular to axis X″ is cut from element 45 and the transducer slab is utilized in the same manner as the transducer slab illustrated in FIG. 2. From an inspection of FIG. 4 it is evident that the nature of the beam of wave energy from slab 50, 51 is such that effective focusing is achieved. Depending upon which of surfaces 50 and 51 is used to introduce wave energy into a test object, the beam may be either divergent or convergent. If desired, surfaces 46 and 47 may be cylindrical instead of spherical.

Figures 5, 6, 7:
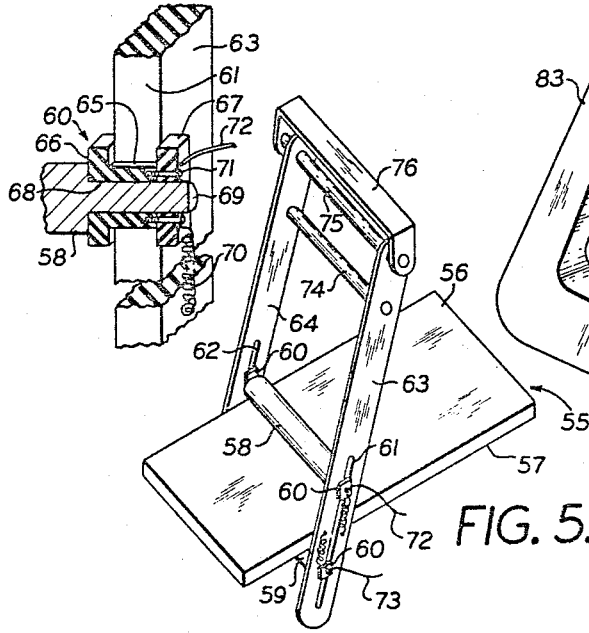
FIG. 5 is a perspective view of another form of apparatus which may be employed to fabricate a transducer in accordance with the invention.
FIG. 6 is an enlarged view, partly in cross section, of a portion of the apparatus illustrated in FIG. 5.
FIG. 7 is a perspective view of still another form of apparatus which may be employed to fabricate a transducer in accordance with the invention.

A transducer may also be fabricated by means of apparatus illustrated in FIG. 5. A flat slab 55 of polarizable piezo-electric material has parallel upper and lower surfaces 56 and 57 contacted by rollers 58 and 59 of electrically conductive material. Each roller is supported at its ends by an individual one of fittings 60 that are mounted for sliding movement in slots 61 and 62 of parallel arms 63 and 64.

As shown in FIG. 6, each fitting 60 is constructed of an electrically insulating material and includes a flat shank 65 received within its slot, such as slot 61 in arm 63, for longitudinal sliding movement. Opposed heads 66 and 67 which are larger than the width of slot 61 hold the fitting in place while permitting its sliding movement. A central opening 68 receives a reduced diameter end portion 69 of contact roller 58 for rotational movement. Thus, the contact rollers 58 and 59 are supported by the arms 63 and 64 for rotational movement as well as longitudinal movement along the arms. A tension spring 70 biases the rollers toward one another thereby to maintain electrical contact with slab 55. Since all fittings are identical, as thus far described, a detailed description of each is deemed unnecessary.

An electrical brush 71 is in contact with the right-hand end of roller 58 and a similar brush (not shown) contacts the corresponding portion of roller 59. Leads 72 and 73 extend from the brushes to polarizing potential source 17, 18 (FIG. 1). A suitable liquid couplant may be provided for rollers 58 and 59 or the entire array may be immersed in a high dielectric liquid such as silicone oil.

Arms 63 and 64 are connected together by a cross rod 74 and by another cross rod 75 which is pivotally supported by a bracket 76. The arms 63 and 64 may thus be pivoted about the axis of rod 76 as the rollers travel along surfaces 56 and 57 of element 55. It is evident that with the foregoing arrangement, the axis of polarization extends in the direction of the arms 63 and 64 and thus the polarization angle varies along element 55. After polarization electrodes are provided for element 55 and it is utilized as shown in FIG. 2.

An alternative mode of operation can be achieved by mounting the upper ends of arms 63 and 64 on a carriage movable on tracks parallel to surface 56 of element 55 while the arms are fixed at an adjustable angle relative to that surface. The resulting polarization will be uniform and at the value to which the angle is adjusted.

Another form of apparatus for fabricating a transducer in accordance with the invention is illustrated in FIG. 7. A disc 80 of polarizable piezo-electric material is supported at its edge by a plurality of rollers 81 constructed of an electrically insulating material. At least one of the rollers 81 is driven so that disc 80 is rotated about its rotational axis 82. A C-shaped member 83 of electrically insulating material straddles disc 80 and has a portion 84 extending perpendicularly from one of its arms. Extension portion 84 is pivoted at its end to a fixed support 85 for pivoted movement about an axis 86 which intersects axis 82. Electrode carriers 87 and 88 are suitably mounted on the ends of the arms of C-shaped member 83 on opposite sides of disc 80. The electrode carriers 87 and 88 are aligned with and spring biased toward one another and each carries a contact such as the conductive ball 89 illustrated for carrier 87.

In operation, a polarizing potential is applied to the electrode carriers 87 and 88 and C-shaped member is tilted either manually or automatically as disc 80 rotates about axis 82. Thus, ball 89 describes a spiral path on its associated surface of disc 80. Since the polarization angle varies with the position of C-shaped member 83 with respect to tilt axis 86, the resulting transducer will exhibit a wave energy pattern of focused configuration.

Although lead zirconate has been specified, it is evident that any piezo-electric material polarizable by the application of a potential may be utilized in the practice of the invention such as barium titanate or lead metaniobate.

If desired, in the embodiment of FIGS. 1, 3 and 4, a block of polarizable material of suitable size may be employed so that one or more slabs may be extracted.

It is to be understood that where reference is made to a transducer in its function of the conversion of electrical energy to wave energy, the theorem of reciprocity applies, and the transducer exhibits the same or similar characteristics in its function of converting wave energy to electrical energy.

While particular embodiments of the present invention have been shown and described, it is obvious that changes and modifications may be made without departing from this invention in its broader aspects and therefore, the aim in the appended claims is to cover all such changes and modifications as fall within the true spirit and scope of this invention.

What is claimed is:

1. An electro-mechanical transducer comprising a piezo-electric element having a pair of substantially parallel surfaces and polarized at least in part to generate mechanical wave energy along an axis disposed at an angle other than ninety degrees relative to said surfaces at the point of origin of said wave energy.

2. An electro-mechanical transducer comprising: a piezo-electric element having a pair of substantially parallel spaced planar surfaces and polarized at least in part to generate mechanical wave energy along an axis disposed at an angle other than ninety degrees relative to said surfaces at the point of origin of said wave energy; and means for establishing electrical circuit connections to said surfaces.

3. An electro-mechanical transducer comprising a slab cut from a polarizable piezo-electric element polarized to generate mechanical wave energy along a given axis, said slab having substantially parallel spaced planar surfaces defining an angle other than ninety degrees relative to said axis at the point of origin of said wave energy.

4. An electro-mechanical transducer comprising: a unitary piezo-electric element having adjacent sections with non-parallel axes polarized to generate mechanical wave energy along respective non-parallel axes at angles other than normal to the wave-emitting surface of said element measured at the point of origin of said wave energy.

5. An electro-mechanical transducer comprising a substantially flat unitary piezo-electric element having three adjacent sections, a central section being polarized to generate mechanical wave energy along a given axis and the remaining sections being polarized to generate mechanical wave energy along axes non-parallel to said given axis.

6. An electro-mechanical transducer comprising a substantially flat piezo-electric element having first and second spaced parallel surfaces, said element being polarized to generate mechanical wave energy from substantially all portions of the first of said surfaces to a substantially common point upon application of an electrical potential between said first and second surfaces.

References Cited by the Examiner
UNITED STATES PATENTS

| | | | |
|---|---|---|---|
| 2,420,652 | 5/47 | Chilowsky | 29—25.35 |
| 2,565,159 | 8/51 | Williams | 310—9.6 |
| 2,645,727 | 7/53 | Willard | 310—9.5 |
| 2,752,662 | 7/56 | Crooks et al. | 29—25.35 |
| 2,759,241 | 8/56 | Strum | 29—25.35 |
| 2,777,188 | 1/57 | Remeika | 29—25.35 |
| 2,834,952 | 5/58 | Harris | 310—9.6 |
| 2,888,581 | 5/59 | Pahud | 310—8.7 |
| 2,939,970 | 6/60 | Dranetz et al. | 310—8.7 |

MILTON O. HIRSHFIELD, *Primary Examiner.*

ORIS L. RADER, *Examiner.*